(12) United States Patent
Bowman et al.

(10) Patent No.: US 6,557,201 B1
(45) Date of Patent: May 6, 2003

(54) STRESSED-SKIN MODULAR FIBER REINFORCED PLASTIC BRIDGE

(75) Inventors: Keith B. Bowman, Casstown, OH (US); David H. Mollenhauer, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/845,113

(22) Filed: Apr. 27, 2001

Related U.S. Application Data

(63) Continuation of application No. 09/289,868, filed on Apr. 12, 1999, now abandoned.

(51) Int. Cl.$^7$ ............................................... E01D 15/12
(52) U.S. Cl. ............................................... 14/2.4; 14/78
(58) Field of Search .......................... 14/2.4, 2.6, 27, 14/74, 78, 73; 156/169, 172

(56) References Cited

U.S. PATENT DOCUMENTS

| | | | | | |
|---|---|---|---|---|---|
| 1,583,638 | A | * | 5/1926 | Zadigian | 405/219 |
| 3,012,533 | A | * | 12/1961 | Tellefsen | 114/267 |
| 3,083,665 | A | * | 4/1963 | Steidley | 114/267 |
| 4,073,025 | A | * | 2/1978 | Peckham | 14/2.4 |
| 4,106,149 | A | * | 8/1978 | Larsson | 14/27 |
| 4,318,361 | A | * | 3/1982 | Sluys | 114/263 |
| 4,945,594 | A | * | 8/1990 | Tomb | 14/74 |
| 5,043,033 | A | * | 8/1991 | Fyfe | 156/71 |
| 5,108,810 | A | * | 4/1992 | Williams | 428/36.1 |
| 5,218,810 | A | * | 6/1993 | Isley, Jr. | 52/725 |
| 5,657,595 | A | * | 8/1997 | Fyfe et al. | 52/252 |
| 5,679,432 | A | * | 10/1997 | Holmquest et al. | 428/318.4 |
| 6,079,072 | A | * | 6/2000 | Katsiri | 14/2.4 |
| H1872 | H | * | 10/2000 | Bowman | 156/172 |
| 6,138,420 | A | * | 10/2000 | Fyfe | 52/262 |
| 6,219,988 | B1 | * | 4/2001 | Mahfouz et al. | 52/721.4 |

FOREIGN PATENT DOCUMENTS

| | | | |
|---|---|---|---|
| JP | 10-131119 | * | 5/1998 |
| JP | 11-286901 | * | 10/1999 |

* cited by examiner

*Primary Examiner*—Gary S. Hartmann
(74) *Attorney, Agent, or Firm*—Bobby D. Scearce; Thomas L. Kundert

(57) ABSTRACT

A monocoque fiber reinforced plastic composite modular bridge structure and fabrication method are described in which, in a preferred embodiment, one or more bridge modules of selected length and cross-section are fabricated by applying composite fabric over a mandrel of substantially the intended shape of the module, enclosing the mandrel and composite in a vacuum bag, infusing the fabric with resin, preferably utilizing the vacuum assisted resin transfer molding process, allowing the resin and fabric to cure, and applying finishing operations to the module for installation at a bridge site.

5 Claims, 2 Drawing Sheets

STRESSED-SKIN MODULAR FIBER REINFORCED PLASTIC BRIDGE

RELATED U.S. APPLICATION

This Application is a Continuation of application Ser. No. 09/289,868 filed Apr. 12, 1999, now abandoned.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the structure and manufacture of modular bridges, and more particularly to modular bridge structures comprising fiber reinforced plastic (FRP) composite in a monocoque construction.

Conventional pedestrian bridges have typically been fabricated of steel, concrete, and wood. Existing composite bridge structures use truss designs in which pultruded composite members are linked together such that each member takes compression or tension similarly to comparable steel construction. Certain composite vehicular bridge structures use non-winding fabrication methods, each structure having many individual parts making up the load carrying substructure and the dead load contributing superstructure (side walls, railings and roofs) fastened together using fabrication processes which are very labor intensive. The resulting structure is typically capable of withstanding the structural load, but is not efficient in load carrying capability. One such structure requires that truss-built sides be transported to the bridge site and assembled with composite floor deck members using standard assembly methods and mechanical fasteners. These fasteners generate stress concentration sites. Because these structures are site specific and can be only partially factory fabricated, substantial disruption of traffic flow at the bridge site may result during bridge assembly.

Substantial improvements in modular FRP bridge structures are described in Bowman, United States Statutory Invention Registration H-1,872, published Oct. 3, 2000 (commonly owned with the invention described herein), the teachings of which are incorporated by reference herein, in which a method for fabricating a fiber reinforced composite bridge module includes in a preferred embodiment the steps of selecting a cross-sectional shape for the bridge module defined by an outer substantially tubular shell having a top side and a bottom side, and a floor deck near the bottom side and at least one keel beam beneath the floor deck and extending lengthwise of the outer shell, the outer shell, floor deck and keel beams defining a plurality of passageways along the module length, winding fiber and impregnating material on mandrels in a plurality of tubular sections defining the plurality of passageways, joining the sections in side-by-side relationship in an assembly substantially defining the selected cross-sectional shape of the module, winding fiber and impregnating material around the assembly to preselected thickness for the outer shell, and curing the fiber and impregnating material.

The present invention provides further novel improvements in composite bridge structures and fabrication methods by providing a low cost FRP composite bridge structure that includes a stressed skin (monocoque) structure, exploits the high specific strength and stiffness of FRP materials, omits nonstructural wall and roof members that add unnecessary weight, has a minimum number of mechanical fasteners and fewer potential structural failure sites, may be fabricated and assembled in modules of various cross sectional shapes, thereby avoiding weather conditions that may hamper installation at the bridge site or may compromise tolerances, and can be transported to the site completely assembled or in modules and installed with minimal disruption of traffic flow.

It is therefore a principal object of the invention to provide an FRP bridge structure and fabrication method.

It is a further object of the invention to provide an inexpensive, strong, lightweight, fatigue resistant and corrosion resistant bridge structure.

It is another object of the invention to provide a monocoque composite bridge structure.

It is yet another object of the invention to provide a method for fabricating a monocoque FRP composite bridge structure.

It is yet another object of the invention to provide an FRP bridge structure that can be fabricated in modular form in various cross sectional shapes and assembled to a desired length.

It is another object of the invention to provide a factory fabricated and assembled bridge structure for installation at a bridge site with minimal interruption of traffic flow.

It is yet another object of the invention to provide a bridge structure requiring substantially lower maintenance during bridge lifetime as compared to previously existing bridge structures.

These and other objects of the invention will become apparent as a detailed description of representative embodiments proceeds.

SUMMARY OF THE INVENTION

In accordance with the foregoing principles and objects of the invention, a monocoque fiber reinforced plastic composite modular bridge structure and fabrication method are described in which, in a preferred embodiment, one or more bridge modules of selected length and cross-section are fabricated by applying composite fabric over a mandrel of substantially the intended shape of the module, enclosing the mandrel and composite in a vacuum bag, infusing the fabric with resin, preferably utilizing the vacuum assisted resin transfer molding process, allowing the resin and fabric to cure, and applying finishing operations to the module for installation at a bridge site.

DESCRIPTION OF THE DRAWINGS

The invention will be more clearly understood from the following detailed description of representative embodiments thereof read in conjunction with the accompanying drawings wherein.

DETAILED DESCRIPTION

Figure 1A:
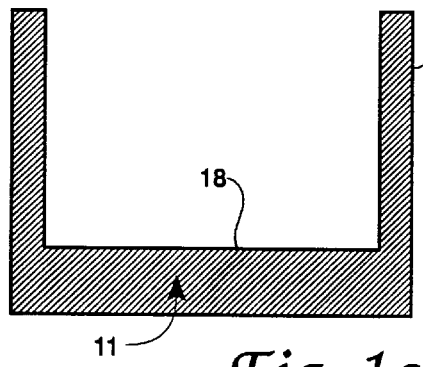
FIGS. 1a, 1b and 1c show representative cross sections of bridge structures illustrative of the invention.
Figure 1B:
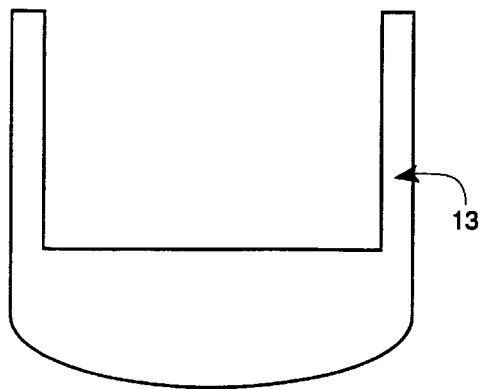
Figure 1C:
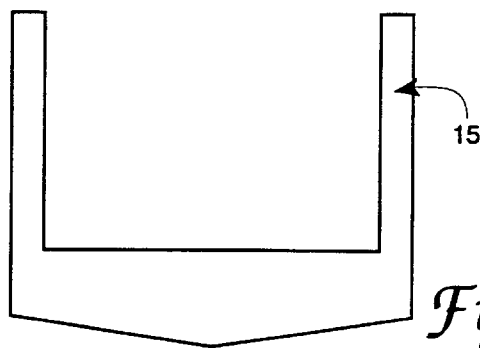
Figure 2:
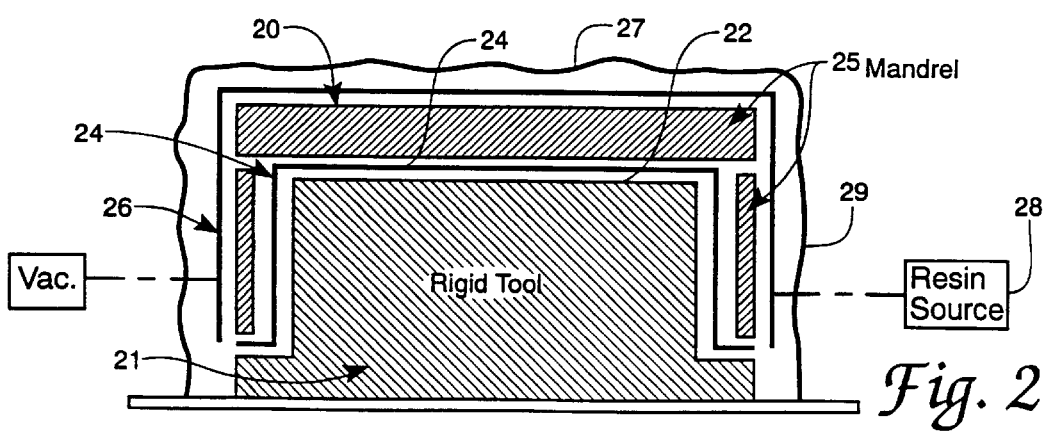
FIG. 2 shows the representative bridge cross section of FIG. 1a in illustration of typical fabrication steps for bridge structures according to the invention.

Referring now to the drawings, FIGS. 1a–c show representative cross sections of modular composite bridge structures 11, 13, 15 illustrative of the invention. FIG. 2 shows the representative bridge cross section of FIG. 1a in illustration of typical fabrication steps for bridge structures according to the invention.

As suggested in the cross-section of FIG. 1a, the invention comprises an open stressed-skin structure wherein a composite skin or covering 17 is formed over a core 18 of preselected cross section and length. Covering 17 of the structure carries a large portion of the structural load to which the bridge is subjected. In prior art structures, the beams or channels of the bridge substructure carry the total load of the bridge but the railings, side walls and ceiling structures do not carry any load and only contribute to the dead weight of the bridge.

Unlike conventional (prior art) bridge structures in which the substructure or load carrying beams are altered to achieve longer spans, the bridge structure of this invention can achieve longer spans by a variety of means. The load carrying side walls can be altered in height an depth, the deck can be deepened, and/or the skins (covering) can be thickened or fabricated from structurally different fibers. The bridge configuration of the invention also allows for the mixing of structural fibers throughout the bridge structure to achieve specific mechanical performance at specific locations along the structure. Each variation in configuration results in a structurally efficient design that does not add additional weight with minimal structural enhancement as is characteristic of conventional designs utilizing load carrying substructure and dead weight super structure. The bridge structure of the invention can be highly through relatively simple modifications.

A bridge structure of the invention may have any suitable cross section, the invention not considered limited by the representative shapes shown in FIGS. 1a–c, although the selected shape should be amenable to fabrication by the composite fabrication process suggested below. The structures may have diameters or widths in the range of about 8 to 15 feet, and may be fabricated in modular sections of lengths limited only by the fabrication method and the capacity of the composite lay-up facility used for fabrication. Typical maximum modular lengths may be up to 60 to 70 feet. As is discussed in more detail below in relation to preferred fabrication and assembly methods, multiple modular sections may be joined together to achieve longer spans.

Referring now specifically to FIG. 2, it is seen that a bridge module 20 substantially of any selected length and cross-sectional configuration may be fabricated according to a preferred process of the invention utilizing the vacuum assisted resin transfer molding (VARTM) process wherein a substantially rigid form or tool 21 having an upper surface shape 22 corresponding to the selected shape of bridge module 20 is provided for molding bridge module 20 thereon. An FRP composite fibrous mat or fabric layer 24 is first placed over tool 21 substantially as shown in FIG. 2.

Typical composite fabric 24 materials useful in the practice of the invention include carbon, graphite, boron aramid fibers having the trade name KEVLAR, glass, aluminum or others as would occur to the skilled artisan guided by these teachings. As discussed more fully below, fabric 24 may be impregnated with suitable materials such as any thermosetting polymers, thermoplastic polymers, or combinations thereof to form the desired FRP in the completed bridge module 20. The structure may be made substantially fire retardant by using glass, carbon or graphite fibers in phenolic polyimide or furan impregnating material, or other combinations as would occur to the skilled artisan guided by these teachings.

After fabric layer 24 is placed over tool 21, a mandrel 25 of suitable structural material such as aluminum or polymeric honeycomb, polymeric foams, carbon foams, plywood, or balsa wood is placed over fabric layer 24. Mandrel 25 substantially defines the ultimate shape of bridge module and may comprise a unitary structure or may comprise two or more components, as illustrated in FIG. 2, which may be assembled to a desired shape. The functions of mandrel 25 are substantially to provide a tool on which to lay the fabric layers comprising the bottom of bridge module 20 during fabrication, and to provide additional axial and buckling stiffnesses to the structure of bridge module 20. The degree to which the structural strength is enhanced depends on the material selected for mandrel 25. Structural foams are available with high strength and moduli that might relax thickness requirements for the stressed composite fabric layer after cure. Lower strength commercially available foams such as polystyrene may be used as a mere form during fabrication, providing little or no structural benefits. By including an arch in the length or spanwise direction of the structure, the load carrying capability of any given cross-sectional configuration increases.

An additional FRP composite fabric layer 26 is then placed over mandrel 25 substantially as illustrated in FIG. 2. Layer 26 comprises substantially the sides and bottom of the completed bridge module 20. It is noted however that layers 24 and 26 may be applied in substantially any manner and configuration. Accordingly, layers 24 and 26 may comprise a single continuous layer enveloping the entirety of mandrel 25, the two-piece layer 24,26 configuration suggested in FIG. 2 not considered limiting of the invention. It is also noted that selective FRP reinforcement layers (not shown in the drawings) may be added to the fabric layer(s) as desired to enhance the load carrying capability of the cured bridge module.

Once the FRP fabric layers are applied, the entire assembly of tool 21, mandrel 25 and FRP layers are enclosed in vacuum bag 27 in preparation for VARTM. As is known in the art, in the VARTM process, a vacuum is pulled on vacuum bag 27 while resin from a resin source 28 is infused under pressure through inlet port 29 and migrates through the dry fabric layer(s) assisted by the application of vacuum to the vacuum bag 27. After completion of the VARTM step, bridge module 20 may be cured within vacuum bag 27 or may be removed from the vacuum bag 27, and the resin infused fabric allowed to cure by elevating the temperature to a level consistent with the resin system chosen for the bridge module structure or by allowing the resin to cure at room temperature if the chosen resin system is amenable to this type of cure. After removal from tool 21 the cured bridge module 20 is then subject to any necessary finishing operations in preparation for use. The deck surface of module 20 may be optionally covered with suitable finishing material such as tile or a rubberized wear surface, and bridge module 20 may further be coated with fire retardant material, if desired.

Figure 3:
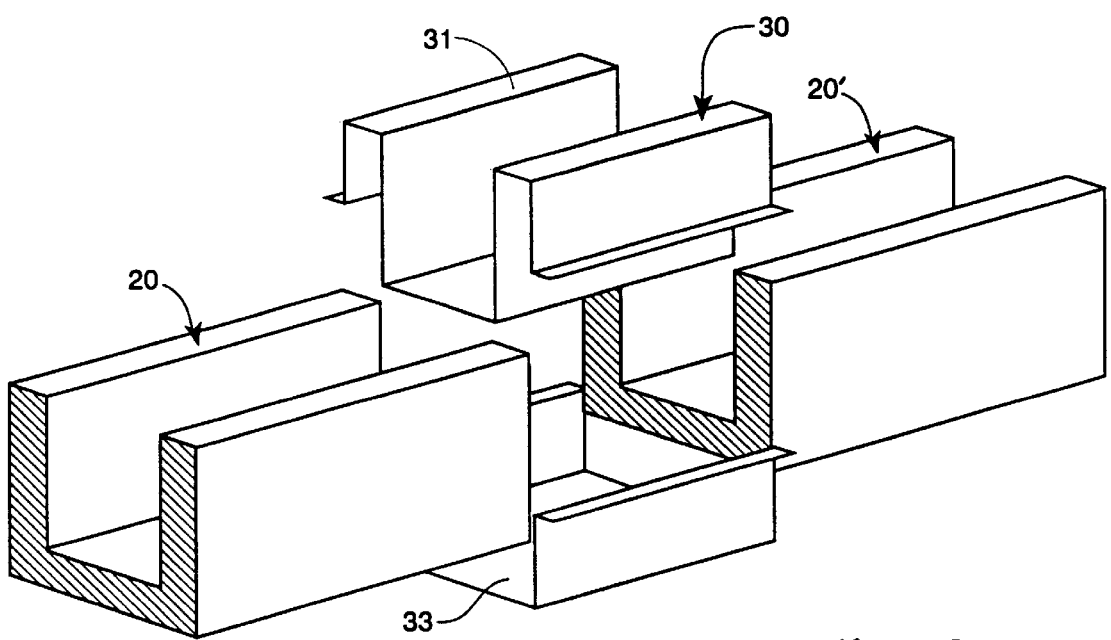
FIG. 3 shows a perspective view of two bridge modules in the FIG. 1a configuration joined using a prefabricated clamp according to the invention.

Referring now to FIG. 3, illustrated therein is a representative joint structure 30 for joining two or more bridge modules 20,20' in an abutting relationship for accommodating a span longer than that which a single module would accommodate. Joint structure 30 may comprise a prefabricated coupling of a shape corresponding to the cross-sectional shape of modules 20,20' applied to end portions of the abutting modules. In joint structure 30, an upper portion 31 thereof may have shape corresponding to and mating with the deck and side walls of modules 20,20', and lower portion 33 may have shape corresponding to and mating with the bottom and side walls of modules 20,20', substantially as shown. The length of joint structure depends on the overall dimensions of modules 20,20', but will typically be in the range of about 0.5 to 1.0 times the width of the abutting modules 20,20'. Portions 31,33 of joint structure 30 may be mechanically clamped together using coupling flanges, or other joining means such as bolts, rivets, welded joints or adhesive, or other means (not shown in the drawings) occurring to the skilled artisan practicing the invention. Alternatively, one of the abutting ends of bridge modules 20,20' may be configured with a flared end for receiving the abutting end of the other module as suggested by Bowman, supra, the entire contents of the same being incorporated here by reference. Other joining means suggested by Bowman, including attachment of a module to a building such as in the construction of a walkway between buildings, may also be utilized herein. Any of the suggested joining means may have enhanced strength when adhesive is applied to areas of modules 20,20' near the abutting ends thereof prior to applying the joint means thereto.

The invention allows for modularity of the bridge structure, unlike conventional structures. Substantially any desired bridge spans can be accomplished by joining two or more bridge modules according to the invention, each module fabricated at the factory and either joined end-to-end in the factory and the assembly transported to the bridge site or transported as modules and assembled at the bridge site, depending on the total length of the bridge span. Once on the bridge site, the modules may be assembled and installed in a very short time, and the installation may be performed at night time or on the weekends to minimize traffic flow disruption.

The invention is described herein as preferring the VARTM process for fabrication of bridge modules according to the invention. It is noted, however, that other composite fabrication methods may be applicable to the invention as would occur to the skilled artisan guided by these teachings. For example, hand lay-up of the FRP composite fabric followed by autoclave cure may be used comprising placing fabric or unidirectional tape that is resin impregnated onto a mold or tool, sealing the tool and fabric in a vacuum bag, placing the vacuum bag with tool and fabric into an autoclave, and heating under pressure to cure the FRP. Other process that may be used include hand layup and resin cure in a low temperature non-pressurized oven, or hand layup and resin cure at room temperature, the specific selected method not considered limiting of the invention.

The invention therefore provides a monocoque fiber reinforced plastic composite bridge structure and fabrication method. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. A monocoque stressed skin fiber reinforced composite bridge structure, comprising two or more bridge modules, each said module comprising:

(a) a lightweight core of preselected length and substantially U-shaped cross section defining a deck and two side walls for said module;

(b) a layer of fiber-reinforced plastic composite material formed over said core and defining integral upper and lower surfaces of said deck and inner and outer surfaces of said side walls;

(c) wherein said fiber-reinforced plastic composite material comprises said stressed skin of said bridge module and wherein said stressed skin is the primary load path for said bridge module; and (d) wherein said two or more said bridge modules are assembled in substantially abutting end-to-end relationship and further comprising a joint structure for joining said modules in said substantially abutting end-to-end relationship, said joint structure including one of a slip fit member configured to receive abutting ends of said bridge modules, and a flared portion on an end of one bridge module for receiving the abutting end of an abutting bridge module.

2. The bridge structure of claim 1 wherein said fiber-reinforced plastic composite material comprises fibers of a material selected from the group consisting of carbon, graphite, boron, aramid, glass, and aluminum.

3. The bridge structure of claim 1 wherein said core comprises a material selected from the group consisting of aluminum, polymeric honeycomb, polymeric foams, carbon foams, plywood and balsa wood.

4. A monocoque stressed skin fiber reinforced composite bridge structure for pedestrian or vehicular traffic, comprising two or more bridge modules, each said module comprising:

(a) a lightweight core of preselected length and substantially U-shaped cross section defining a deck and two side walls for said module;

(b) a layer of cured fiber-reinforced plastic composite material formed over said core and defining integral upper and lower surfaces of said deck and inner and outer surfaces of said side walls;

(c) wherein said layer of composite material provides the primary load carrying path and said core provides for the transfer of load between the upper and lower surfaces of said deck and the inner and outer surfaces of said side walls; and (d) a joint structure for joining said modules in said substantially abutting end-to-end relationship, said joint structure including one of a slip fit member configured toreceive abutting ends of said bridge modules, and aa flared portion on an end of one bridge module for receiving the abutting end of an abutting bridge module.

5. The bridge structure of claim 4 wherein said fiber-reinforced plastic composite material comprises fibers of a material selected from the group consisting of carbon, graphite, boron, aramid, glass, and aluminum.

* * * * *